Jan. 7, 1958 A. H. DUNLAP 2,818,763
NAIL FOR PLASTERBOARD
Filed March 9, 1953
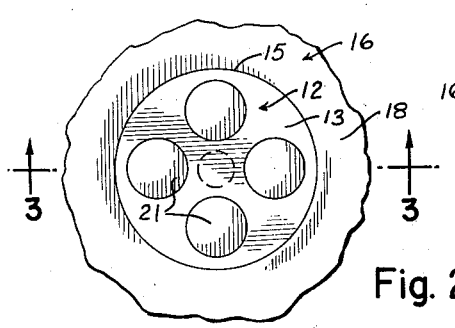
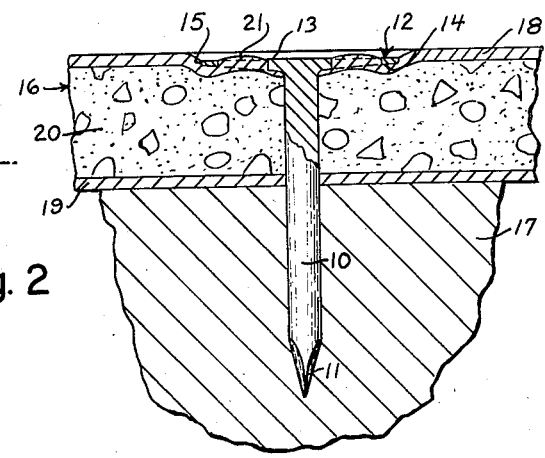
Fig. 2
Fig. 3
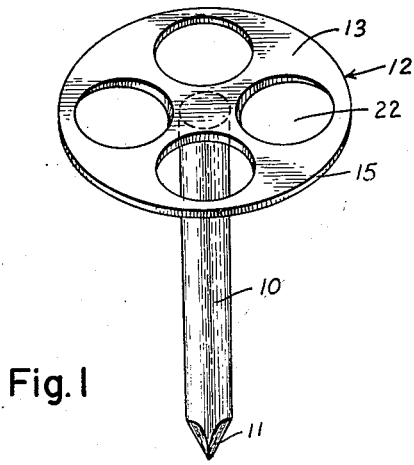
Fig. 1
INVENTOR.
Arthur H. Dunlap
BY
Barnes + Seed
attys.

2,818,763
NAIL FOR PLASTERBOARD

Arthur H. Dunlap, Seattle, Wash.

Application March 9, 1953, Serial No. 341,286

3 Claims. (Cl. 85—28)

The present invention relates to an improved nail particularly adapted for use in dry-wall construction to secure plasterboard or the like in place.

It is the usual procedure in setting nails into plasterboard to drive them inwardly beyond the plane of the outer skin of the board and to fill in the resulting depression over and around the head of the nail with a dress coating of cement to give a perfectly smooth wall surface preparatory to painting or wall papering. To so seat the nails perforce requires that the material beneath the nail heads be compressed. The natural resistance to such compression commonly results in an objectionable bulging around the nail heads and frequently causes the peripheral edge of the nail heads to cut through the relatively tough outer skin of the plasterboard into the comparatively soft interior thereof leaving not only a distorted outer face and a jagged hole next to impossible to dress over, but an ineffective nail. This tendency of the nail heads to cut through the outer skin of the plasterboard is aggravated by way of the fact that the nails are often not driven straight thereby causing the pressure of the nail head on the plasterboard to be concentrated on a small portion of the head instead of over the entire surface thereof.

Another difficulty is commonly experienced in dry-wall construction by way of the fact that as the studs, joists, etc. comprising the framework to which the plasterboard is nailed, gradually further cure after construction, the resulting wood shrinkage and warpage may result in a gap of as much as ⅛ inch between a sheet of plasterboard and the related framework members. Thereafter, pressure exerted against the outside of the wall will frequently cause the plasterboard to move inwardly relative to the nails in the region of the pressure thereby causing the heads of these nails to "pop" free of the dress cement covering them. The adhesion which this cement causes between the nail heads and the outer skin of the plasterboard is substantially the only deterent to such nail popping.

Accordingly, it is a principal object of the present invention to provide an improved nail for plasterboard or the like which will correct the afore-elaborated difficulties presently encountered in the art by relieving the pressure on the plasterboard as the nail head is driven against the outer skin thereof and by increasing the hold of the dress cement on the nail heads.

With the foregoing and other still more particular objects and advantages in view and which will appear and be understood in the course of the following description and claims, the invention consists in the novel features of construction illustrated in the drawing and hereinafter described and claimed.

In the drawings:

Figure 1 is a perspective view of one of my improved nails.

Fig. 2 is a top plan view illustrating one of my nails performing its intended office of firmly securing an area of plasterboard to a wall framework; and Fig. 3 is a sectional view taken on line 3—3 of Fig. 2 with the plasterboard and framework being shown fragmentarily in transverse section.

Referring to the drawings, it is seen that my improved nail has the usual straight shank 10 of circular cross-section having its lower end 11 pointed. At its other end the shank is integrated with a circular head 12 of relatively generous areal extent centered on the shank at right angles thereto. The head has a flat outer face 13 and its under face 14 preferably tapers gently from the shank so that the thickness of the head decreases toward its peripheral edge 15. The latter is made as thin as load conditions on the head will permit.

Formed in the head 12 are a plurality of relief openings 22 shown as being circular and four in number for purposes of example. These openings are made as large as possible without weakening the head to a critical point.

In Figs. 2 and 3 I have shown one of my nails securing a portion of plasterboard 16 to a wall framework 17. The plasterboard is illustrated as being of the type having tough skin layers 18, 19 of cardboard bonded to an intermediate primary layer 20 of gypsum. The nail is driven until its head so compresses the plasterboard therebeneath that the flat outer face 13 of the head is below the plane of the outer face of the skin 18. The resulting depression in the portion of the plasterboard under and immediately surrounding the nail head can be seen readily by reference to Fig. 2. It is apparent that the compressed plasterboard between the nail head and the framework 17 will attempt to relieve itself and with the prior nails the result has been a bulging around the peripheral edge of the nail heads which so concentrates the forces occurring at this edge that the outer skin 18 is commonly perforated thereby. At times this peripheral bulging of the plasterboard around the prior nail heads so distorts the outer face of the plasterboard that it is impossible to obtain a smooth face. With my nail, on the other hand, these compressive forces beneath the nail head are relieved by the relief openings 22 which permit the skin 18 to be pushed outwardly and into these openings forming shallow knobs 21. These knobs do not extend above the outer face plane of the skin and hence they can be smoothly dressed over with cement. Furthermore, this dress cement, by adhering to the knobs 21, will tend to lock the nail heads and outer skin 18 of the plasterboard together. Thus, if a gap develops between the inner skin 19 and the framework 17 due to shrinkage or warpage of the latter, there will be much less likelihood of the nail "popping" than if the nail head did not have the openings 22.

Vizualizing modifications obviously within the teachings of the invention, it is my intention that the hereto annexed claims be given a scope in their interpretation commensurate with the state of the advance in the art.

What I claim is:

1. An improved nail for plasterboard having an elongated shank adapted to pass by a pointed end, through a sheet of plasterboard, and having its other end made integral with a thin head of comparatively large diameter for depressing the outer face of said sheet so as to completely lie in a shallow depression inwardly of the normal plane of said surface, said head extending at right angles to said shank and having a plurality of openings into which the plasterboard beneath the head can protrude for relief and for contact by cement applied to fill said depression, both the top and under surfaces of said head being devoid of any projections and said under surface being devoid of any concavity near its perimeter.

2. An improved nail for plasterboard having an elongated shank adapted to pass by a pointed end, through a sheet of plasterboard, and having its other end made integral with a thin head of comparatively large diameter for depressing the outer face of said sheet so as to completely lie in a shallow depression inwardly of the normal plane of said surface, said head extending to right angles to said shank and having a plurality of openings into which the plasterboard beneath the head can protrude for relief and for contact by cement applied to fill said depression, the top surface of said head being devoid of any projections and the under surface thereof being moderately convex giving to the head a thickness which gently diminishes toward its perimeter.

3. An improved nail for plasterboard having an elongated shank adapted to pass by a pointed end, through a sheet of plasterboard, and having its other end made integral with a thin head of comparatively large diameter for depressing the outer face of said sheet so as to completely lie in a shallow depression inwardly of the normal plane of said surface, said head extending at right angles to said shank and having a plurality of openings into which the plasterboard beneath the head can protrude for relief and for contact by cement applied to fill said depression, the top surface of said head being completely flat and the under surface thereof being slightly flared thereby feathering the head toward its perimeter.

References Cited in the file of this patent
UNITED STATES PATENTS

| | | |
|---|---|---|
| 1,308,265 | Spear | July 1, 1919 |
| 1,724,394 | Chamberlain | Aug. 13, 1929 |
| 1,932,358 | Thomson | Oct. 24, 1933 |
| 2,130,563 | Ready | Sept. 20, 1938 |
| 2,427,392 | Eckel | Sept. 16, 1945 |